United States Patent
Dams et al.

(10) Patent No.: US 7,384,192 B2
(45) Date of Patent: Jun. 10, 2008

(54) METHOD FOR MEASURING COOLING/HEATING CURVES OF MOLTEN MASSES

(75) Inventors: Francis Dams, Kessel-Lo (BE); Jacques Plessers, Houthalen-Helchteren (BE); Paul Clement Verstreken, Aarschot (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 11/326,764

(22) Filed: Jan. 6, 2006

(65) Prior Publication Data
US 2006/0114967 A1 Jun. 1, 2006

Related U.S. Application Data

(63) Continuation of application No. PCT/EP2004/006830, filed on Jun. 24, 2004.

(30) Foreign Application Priority Data
Jul. 9, 2003 (DE) ............................. 103 31 124

(51) Int. Cl.
*G01N 25/04* (2006.01)
(52) U.S. Cl. ............................. 374/139; 374/26; 374/4; 374/5; 374/141
(58) Field of Classification Search ................ 374/139, 374/140, 130, 131, 141, 208, 137, 29, 45, 374/16, 20, 26; 266/274; 73/DIG. 9
See application file for complete search history.

(56) References Cited

U.S. PATENT DOCUMENTS

| | | | | |
|---|---|---|---|---|
| 4,355,907 A | | 10/1982 | Orths et al. | |
| 4,444,516 A | * | 4/1984 | Dostoomian et al. | 374/131 |
| 4,595,300 A | * | 6/1986 | Kaufman | 374/170 |
| 4,881,824 A | * | 11/1989 | Falk et al. | 374/140 |
| 5,163,321 A | * | 11/1992 | Perales | 73/152.52 |
| 5,585,914 A | * | 12/1996 | Yamasaki et al. | 356/44 |
| 5,730,527 A | * | 3/1998 | Takayama et al. | 374/131 |

(Continued)

FOREIGN PATENT DOCUMENTS

| | | |
|---|---|---|
| DE | 36 31 645 A1 | 3/1987 |
| EP | 0 655 613 A1 | 5/1995 |
| EP | 0 802 401 A1 | 10/1997 |
| EP | 0 646 778 B1 | 9/1998 |
| JP | 62185129 A | 8/1987 |
| JP | 62185130 A | 8/1987 |

*Primary Examiner*—Gail Verbitsky
(74) *Attorney, Agent, or Firm*—Panitch Schwarze Belisario & Nadel LLP

(57) ABSTRACT

A method is provided for measuring the cooling curve of melts and/or the heating curve of melt samples with an optical fiber, wherein an immersion end of the optical fiber having an at least partially free surface is surrounded with a spacing by a temperature-resistant sample-receiving chamber. The optical fiber is immersed with its immersion end in the melt, and a sample is thereby formed in the sample-receiving chamber. The sample-receiving chamber with the sample and the optical fiber are thereafter pulled out of the molten metal. The cooling curve of the sample and/or, after previous solidification of the sample, the temperature profile during heating is measured with reference to a signal obtained by the optical fiber and forwarded to a measurement device. In addition, a corresponding device is provided for the measuring method.

16 Claims, 2 Drawing Sheets

U.S. PATENT DOCUMENTS

| | | | |
|---|---|---|---|
| 5,752,772 A * | 5/1998 | Verstreken et al. | 374/139 |
| 5,917,145 A * | 6/1999 | Parent et al. | 136/234 |
| 6,004,031 A * | 12/1999 | Takayama et al. | 374/131 |
| 6,106,150 A | 8/2000 | Lindholm et al. | |
| 6,139,180 A * | 10/2000 | Usher et al. | 374/1 |
| 6,227,702 B1 * | 5/2001 | Yamada et al. | 374/140 |
| 6,543,934 B1 * | 4/2003 | Hammer et al. | 374/134 |
| 6,964,516 B2 * | 11/2005 | Coleman, Jr. | 374/139 |
| 2003/0002560 A1 * | 1/2003 | Yamanaka et al. | 374/139 |
| 2003/0103551 A1 * | 6/2003 | Haddad et al. | 374/136 |
| 2004/0240518 A1 * | 12/2004 | Memoli et al. | 374/139 |

\* cited by examiner

METHOD FOR MEASURING COOLING/HEATING CURVES OF MOLTEN MASSES

CROSS-REFERENCE TO RELATED APPLICATIONS

This application is a continuation of International Application No. PCT/EP2004/006830, filed Jun. 24, 2004, which was published in the German language on Jan. 20, 2005, under International Publication No. WO 2005/005945 A1, and the disclosure of which is incorporated herein by reference.

BACKGROUND OF THE INVENTION

The invention relates to a method for measuring the cooling curves of molten masses (melts) and/or the heating curves of melt samples by an optical fiber. For this measurement an immersion end of the optical fiber having an at least partially free surface is surrounded with a spacing by a temperature-resistant sample-receiving chamber, such that the optical fiber is immersed with its immersion end in the melt. In this way, a sample is formed in the sample-receiving chamber, and the sample-receiving chamber with the sample and the optical fiber is thereafter pulled out of the molten metal. The cooling curve of the sample and/or, after previous solidification of the sample, the temperature profile during heating is measured with reference to a signal obtained by the optical fiber and forwarded to a measurement device. In addition, the invention relates to a corresponding device as well as to its use. Here, melts are understood to include both melts of pure metals, such as iron, copper, or steel, or alloys, as well as cryolite melts, molten salts, or molten glass.

Temperature measurement methods and devices, in which liquid temperatures are measured with the aid of optical fibers at high temperature, are known from European Patent EP 646 778 B1, among others. Additional devices are known from U.S. Pat. No. 4,355,907. There, an immersion sensor is described, with which a sample of a molten metal is taken. The sample thereby adheres in a hollow space. A graphite plate is arranged between the hollow space and the optical fiber receiving the measurement values.

A sample vessel, into which molten metal is poured and in which the temperature of the molten metal is then measured by means of an optical fiber, is known from German published patent application DE 36 31 645 A1. Other devices for measuring the temperature in molten metals are known from Japanese published patent applications JP 62-185129 and JP 62-185130. In addition, methods for measuring the melting-point temperature in a smelting crucible with the aid of optical radiation are known from U.S. Pat. No. 6,106,150 and U.S. Pat. No. 6,004,031, or from European published patent application EP 802 401 A1.

BRIEF SUMMARY OF THE INVENTION

An object of the present invention is to improve the known methods or devices.

The above object is achieved according to the invention by a method and device described at the outset, in which both the end face and also a portion of the side wall of the immersion end of the optical fiber have a free surface or are brought into direct contact with the melt. The measurement accuracy and the response time of the method and device can thereby be improved.

In a particular embodiment, it is advantageous that the length of the portion of the side wall of the optical fiber in direct contact with the melt be at least 10 times, preferably at least 30 times, as large as the diameter of the free surface of the end face of the optical fiber, which is brought into direct contact with the melt for the measurement.

Preferably, after the immersion of the immersion end of the optical fiber in the melt, a reduced pressure is generated in the sample-receiving chamber, and melt is drawn into the sample-receiving chamber, which thereby significantly improves the sampling as such. It is also possible to bring the sample into the sample-receiving chamber by ferrostatic pressure. In addition, it is useful that, after the measurement of the cooling curve, the optical fiber be immersed again in the melt and that an increased pressure be generated in the sample-receiving chamber, such that liquid melt is forced out of the sample-receiving chamber. Naturally, the material can also be forced out after the measurement of the heating curve. It can also be useful that, after the measurement of the cooling and/or heating curve, the immersion end of the fiber and the end of the sample-receiving chamber filled with melt be cut off, in order to remove possibly damaged or expended material.

In addition to the measurement of the cooling curve of the melt or the heating curve of previously solidified melt samples, which can provide information on material properties, the bath temperature of the melt can also be measured. Advantageously, the immersion end of the optical fiber can be set in vibration at least intermittently, in order to prevent undercooling of the sample. The method can be used preferably for measuring the liquidus temperature and/or a phase transition temperature of the melt. Advantageously, the end face of the optical fiber has a free surface, in order to improve the signal reception. In particular, the optical fiber can be formed from sapphire or from quartz glass, particularly in order to be stable at higher temperature ranges.

Preferably, the sample-receiving chamber is formed as a tube, especially from quartz glass or from metal or ceramic. A slag cap can be arranged at the immersion end of the sample-receiving chamber, in order to prevent material lying on the melt to be analyzed from entering the sample-receiving chamber. The slag cap is typically made from a material that melts or dissolves during passage through the layer lying on or in the melt.

The sample-receiving chamber is preferably connected pneumatically to a device for generating an increased pressure or a reduced pressure, in order to be able to set and optionally to precisely regulate the necessary pressure. In addition, it is useful that the optical fiber be connected to a vibrator. The vibrator can be arranged, for example, on the carrier for the fiber. By transfer of a vibration to the fiber and to the sample-receiving chamber, the vibrator has the effect of preventing undercooling of the melt to be analyzed. For this reason, the coupling of the vibrator to the sample-receiving chamber is likewise usefully guaranteed.

The device according to the invention can be used both for measuring the bath temperature of the melt and also for measuring the liquidus temperature and/or a phase transition temperature of the melt.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is schematic side view of one embodiment of a measurement device with carrier tube for use in the invention.

DETAILED DESCRIPTION OF THE INVENTION

Figure 1:
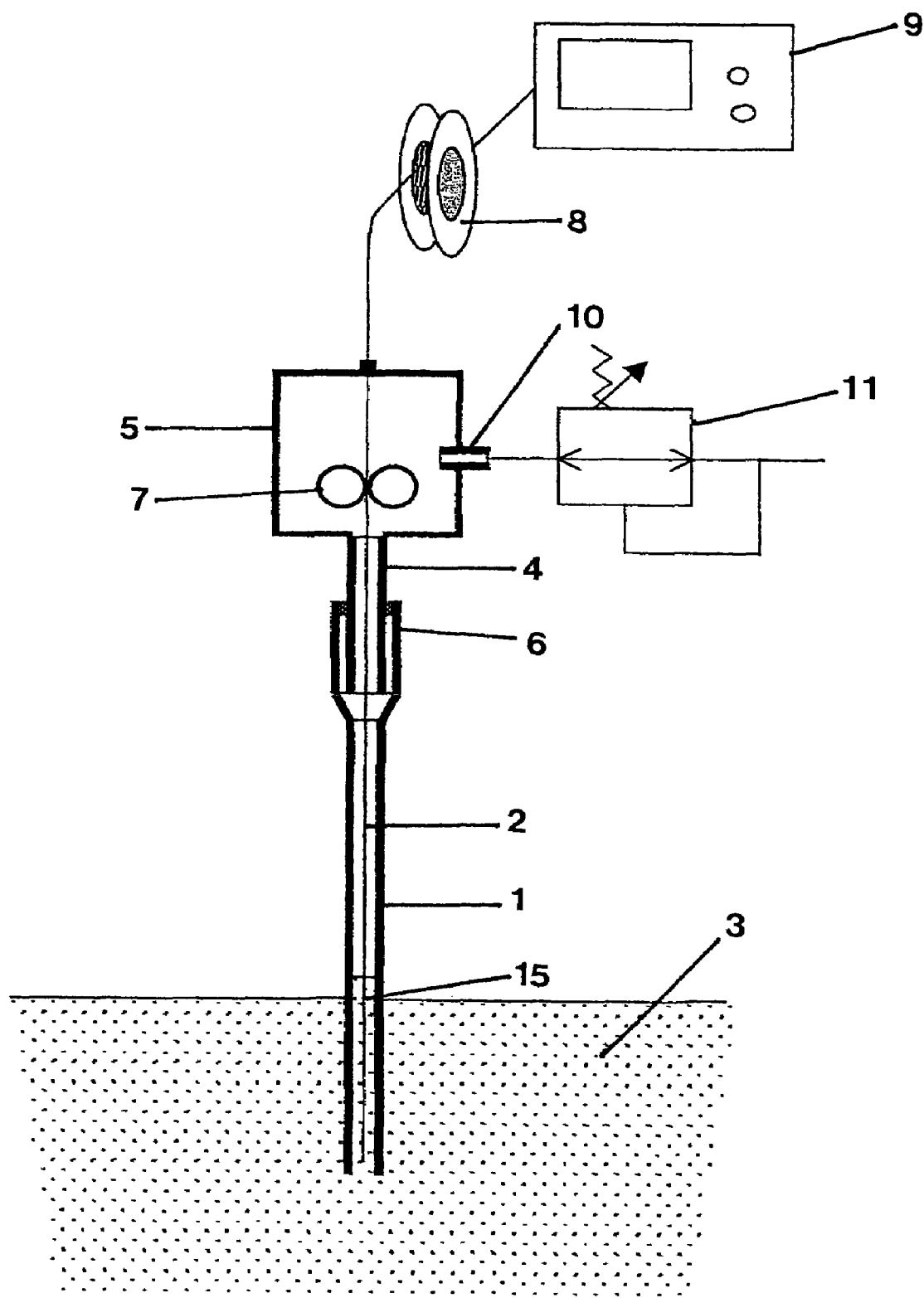

The embodiment shown in FIG. 1 has a replaceable carrier tube 1, through which the optical fiber 2 is guided. The carrier tube 1 can be replaced after use in the molten metal 3. For this purpose, it is removed from the connecting tube 4 of the housing 5, and a new carrier tube 1 is placed on the connecting tube 4 with a sealed connection 6. In the housing 5, a system of transport rollers 7 is arranged, with whose aid the optical fiber 2 is unwound from a spool 8 and fed to the molten metal 3.

The immersion end of the fiber 2 has a free surface both at the end face and also at the portion of the side wall connected to the end face. The remaining portion of the fiber can have a coating, for example made from plastic, which can be removed, for example by combustion. The other end of the optical fiber is connected to a measurement device 9, which is used for signal reception and evaluation.

The housing 5 further contains a gas connection port 10, to which the increased pressure/reduced pressure unit 11 is attached.

Figure 2:
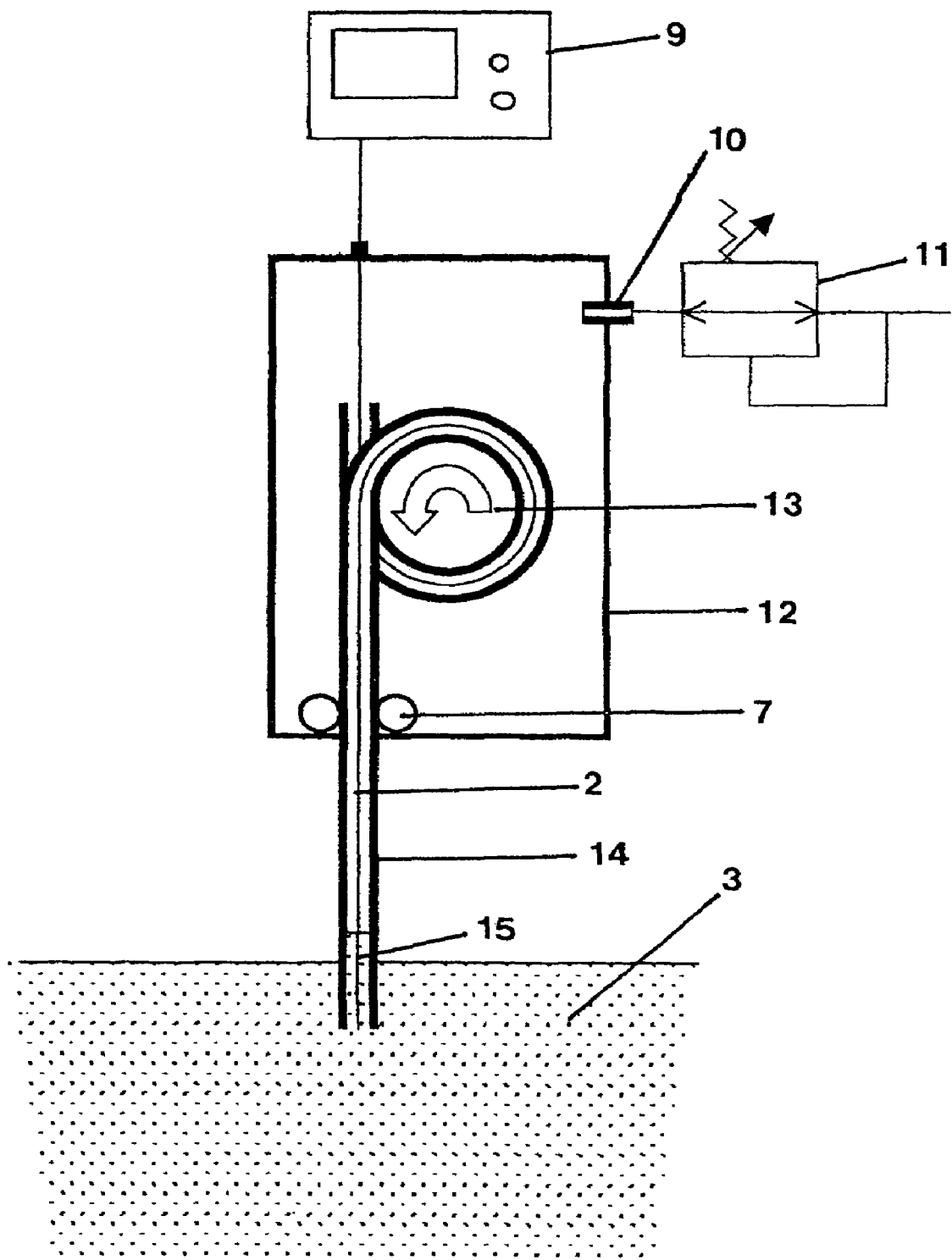
FIG. 2 is a schematic side view of another embodiment of a measurement device for use in the invention.

The embodiment shown in FIG. 2 has a cable box 12 as the core piece. In this cable box 12, the optical fiber 2 is wound on a roller 13. The optical fiber 2 is surrounded by a cladding tube 14, which is unwound together with the fiber 2 and fed to the molten metal 3 by transport rollers 7. The end of the optical fiber 2 facing away from the molten metal 3 is connected to the measurement device 9. Just like the housing 5 in the embodiment according to FIG. 1, the cable box 12 is hermetically sealed and has a gas connection port 10. The increased pressure/reduced pressure unit 11 is connected to this gas connection port 10.

The optical fiber 2 has a free surface at its end facing the molten metal 3, both at the end face and also on the side wall, wherein the length of the free surface of the optical fiber 2, measured from the end face in the longitudinal direction, is more than 30 times the diameter of the end face of the optical fiber 2 intended for immersion in the molten metal 3.

For measurement, the optical fiber 2 is immersed with its immersion end in the melt 3. Here, a reduced pressure is generated in the carrier tube 1 or the cladding tube 14, and a portion 15 of the melt is drawn into a bottom portion of the tube. This bottom portion of the carrier tube 1 or the cladding tube 14 forms the sample-receiving chamber. The device with the sample-receiving chamber and the sample located therein (portion 15 of molten metal 3 drawn into the sample-receiving chamber) is pulled from the molten metal 3. Outside of the molten metal 3, the temperature is significantly lower than in the molten metal 3, so that the sample is cooled and the cooling curve is recorded with reference to the radiation signal obtained by the optical fiber 2 and forwarded to the measurement device 9. Here, one takes advantage of the known effect of black-body radiation.

Instead of or in addition to the cooling curve, the sample can be heated/melted after solidification/cooling, for example by immersion of the sample-receiving chamber of the sampling device in the melt. In this manner, the heating curve is likewise recorded and evaluated as a temperature-time diagram.

The cooling curve/heating curve gives information about the liquidus temperature and/or the solidus temperature, because at this temperature in a temperature-time diagram, a temperature plateau is registered over a short time. Likewise, phase transitions within the cooling molten metal can be identified by temperature plateaus in the temperature-time diagram. As long as the immersion end of the optical fiber 2 is itself located in the molten metal 3, its actual bath temperature can be measured.

After measuring the cooling curve, the optical fiber 2 can be immersed again in the molten metal 3. The sample thereby melts. After melting, the heating curve can be determined. Thereafter, an increased pressure is generated via the gas connection port 10 in the measurement device, especially within the carrier tube 1 or the cladding tube 14, so that the liquid molten sample is forced out of the sample-receiving chamber. The device can then be used for new sampling.

If necessary, in the embodiment according to FIG. 1, the carrier tube 1 must be replaced, and the optical fiber 2 is then guided into the new carrier tube 1. In the embodiment according to FIG. 2, the immersion end of the cladding tube 14 is cut off with the optical fiber 2 as well as melt residue possibly contained in the cladding tube 14, as soon as this immersion end has become unusable. The optical fiber 2 is then unwound together with the cladding tube 14 from the spool 13.

In addition, the optical fiber is connected to a vibrator, not shown in the drawing. The vibrator can be arranged, for example, on the carrier 1 for the fiber 2, and by the transfer of a vibration to the fiber 2 and to the sample-receiving chamber, the vibrator has the effect of preventing undercooling of the melt to be analyzed. For this reason, the rigid coupling of the vibrator on the sample-receiving chamber is useful and also sensible.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for measuring the cooling curve of melts and/or the heating curve of melt samples with an optical fiber, comprising the steps of providing an immersion end of the optical fiber with an at least partially free surface, surrounding the immersion end with a spacing by a temperature-resistant sample-receiving chamber, immersing the optical fiber with its immersion end in a melt, thereby forming a sample in the sample-receiving chamber, thereafter pulling the sample-receiving chamber with the sample and the optical fiber out of the melt, and measuring a cooling curve of the sample and/or measuring a temperature profile during heating after previous solidification of the sample, the measuring steps being performed with reference to a signal obtained by the optical fiber and forwarded to a measurement device, wherein both an immersion end face and a portion of a side wall of the immersion end of the optical fiber are brought into direct contact with the melt.

2. The method according to claim 1, wherein a length of the portion of the side wall of the optical fiber located in direct contact with the melt is at least ten times as large as a diameter of the immersion end face of the optical fiber located in direct contact with the melt.

3. The method according to claim 2, wherein the length of the portion of the side wall of the optical fiber located in direct contact with the melt is at least thirty times as large as the diameter of the immersion end face of the optical fiber located in direct contact with the melt.

4. The method according to claim 1, further comprising, after immersion of the immersion end of the optical fiber in the melt, the step of generating a reduced pressure in the sample-receiving chamber such that melt is drawn into the sample-receiving chamber.

5. The method according to claim 4, further comprising, after measuring the cooling curve, the steps of immersing the optical fiber again in the melt, and generating an increased pressure in the sample-receiving chamber such that melt is forced out of the sample-receiving chamber.

6. The method according to claim 4, further comprising, after measuring the cooling curve and/or the heating curve, the step of cutting off the immersion end of the fiber and an end of the sample-receiving chamber filled with melt.

7. The method according to claim 1, further comprising measuring a bath temperature of the melt with the optical fiber.

8. The method according to claim 1, further comprising the step of setting the immersion end of the optical fiber into vibration at least intermittently.

9. The method according to claim 1, wherein a liquidus temperature and/or a solidus temperature and/or a phase transition temperature of the melt are determined.

10. The method according to claim 1, wherein the optical fiber comprises quartz, glass, or sapphire.

11. The method according to claim 1, wherein the sample-receiving chamber has a form of a tube.

12. The method according to claim 1, wherein the sample-receiving chamber comprises quartz glass.

13. The method according to claim 1, wherein the sample-receiving chamber comprises metal or ceramic.

14. The method according to claim 1, wherein a slag cap is arranged on an immersion end of the sample-receiving chamber.

15. The method according to claim 4, wherein the sample-receiving chamber is connected pneumatically to a device (11) for generating increased pressure or reduced pressure.

16. The method according to claim 1, wherein the optical fiber is connected to a vibrator.

* * * * *